United States Patent
La Rocca

[11] Patent Number: 5,734,146
[45] Date of Patent: Mar. 31, 1998

[54] HIGH PRESSURE OXYGEN ASSISTED LASER CUTTING METHOD

[76] Inventor: Aldo Vittorio La Rocca, Frazione Revigliasco - Viale dei Castagni, 4, 10020 Moncalieri, Italy

[21] Appl. No.: 578,571

[22] PCT Filed: Jun. 21, 1994

[86] PCT No.: PCT/IT94/00089

§ 371 Date: Feb. 26, 1996

§ 102(e) Date: Feb. 26, 1996

[87] PCT Pub. No.: WO95/00282

PCT Pub. Date: Jan. 5, 1995

[30] Foreign Application Priority Data

Jun. 21, 1993 [IT] Italy ............... TO93A0447

[51] Int. Cl.⁶ .................................... B23K 26/14
[52] U.S. Cl. .......................... 219/121.72; 219/121.84
[58] Field of Search .............. 219/121.61, 121.67, 219/121.72, 121.84

[56] References Cited

U.S. PATENT DOCUMENTS

| | | | |
|---|---|---|---|
| 3,597,578 | 8/1971 | Sullivan et al. | 219/121.67 |
| 4,010,345 | 3/1977 | Banas et al. | |
| 4,038,108 | 7/1977 | Engel et al. | 219/121.72 |
| 4,724,297 | 2/1988 | Nielsen | 219/121.67 |

FOREIGN PATENT DOCUMENTS 9310938  6/1993  WIPO.

OTHER PUBLICATIONS

Nielsen, S.E., "Laser Cutting With High Pressure Cutting Gases and Mixed Gases" in: Quenzar, A., Proceedings of the 3rd International Conference of Lasers in Manufacturig (New York, Springer-Verlag, Jun. 1986), pp. 25–44.

Chen, S.L. et al., "The Theoretical Investigation of Gas Assisted Lase Cutting", ICALEO '91, Nov. 1991, pp. 221–230.

E. Beyer, et al.,"Schneiden mit Laserstrahlung", *Laser und Optoelektronik*, vol. 17, No. 3, Sep. 1985, pp. 282–290.

A. Kar, et al., "Two-dimensional model of material ... laser irradiation", *Journal of Applied Physics* 68(1990), No. 8, Oct. 15, 1990, pp. 3884–3891.

A Ivarson et al., "Laser cutting of steels ... during cutting", *Welding in the World*, 30(1992)May/Jun., No. 5/6, pp. 116–125.

G. Marot, et al., "State of art in laser maching", *Mecanique Materiaux Electricite*, 1/93, No. 447, pp. 4–9.

*Primary Examiner*—Teresa J. Walberg
*Assistant Examiner*—Gregory L. Mills
*Attorney, Agent, or Firm*—Graham & James LLP

[57] ABSTRACT

A method for cutting a piece (2) of ferrous material by a laser beam (3), wherein an oxygen jet is conveyed on to cutting area (6) through a solid walled duct (13), guiding the jet substantially until it comes into contact with a surface (7) of workpiece (2); the laser beam (3) exercising on workpiece (2) a power density greater than $10^6$ kW/cm², oxygen being conveyed on to the workpiece (2) with such impact pressure, as to trigger, at such power density, iron oxidation exothermic reactions of the combustion type, and being conveyed in such quantities, as to slightly exceed the relevant stoichiometric ratio, so that such reactions may be complete, as well as maintained under dynamic balance conditions.

9 Claims, 1 Drawing Sheet

HIGH PRESSURE OXYGEN ASSISTED LASER CUTTING METHOD

TECHNICAL FIELD

The present invention relates to a cutting process by means of a laser beam.

BACKGROUND ART

As it is known, laser cutting, e.g. of a metal plate, is usually performed with the aid of a jet of gas directed on to the cutting area so that the liquefied material may be easily flushed out by means of both fluid and mechanical actions originating from the impact of the gas with the material.

Oxygen is generally employed as such in cutting ferrous materials, due to the noticeable iron oxidation exothermic reaction produced at high temperatures (over 720° C.) of the combustion type; if properly employed, the energy so produced, along with the fluid-thermodynamic effects, may result, for a given laser power, in higher cutting speed, improved flushout of the liquefied material and more accurate surface finish of the cutting faces.

Results have so far been unsatisfactory as to both cutting speed and quality.

Indeed, cutting processes currently in use allow for limited cutting speed (a few meters or tens of meters per minute), surface finish of the cutting faces being often unsuitable owing to undesired geometrical and/or metallurgical properties (scoring, droplets of liquified material, hardened areas).

Actually, the phenomena taking place in the cutting area are highly complex ones, due to the presence of a fluid-thermodynamic field, non stationary by nature, in that it is caused by the interaction between a gas and the material being cut; the gas is therefore subjected to intense heat by both laser beam and liquified material, as well as increased by the mass of the material in the form of liquid droplets varying in size, which may be converted into steam; the latter may in turn be energized or even ionized.

If the gas, e.g., oxygen, is reactive, the iron oxidation (combustion) exothermic reaction triggered at temperatures exceeding 720° C. further emphasizes the above phenomena, causing their instability in time to become more markedly so.

Not only are commonly used laser cutting processes affected by such phenomena, they also amplify them, owing to the improper management of both gas and other process parameters.

For instance, in most known laser cutting equipment oxygen is conveyed by means of a conical nozzle on to the cutting area, with no separation between it and the laser beam, the latter being focused through said nozzle. The drawbacks connected with such method are manyfold.

Firstly, oxygen consumption is too high, most of it impinging on the surface of the material surrounding the sides of the cut, thus failing to flash out the liquified material. Moreover, the gas jet, freely directed on to the cutting surface, shows instability as to both direction and speed, which amplifies the alterations in flow caused by both internal aerodynamic factors (boundary layers and related reduction of the duct section already at its entry) and external ones (atmospheric air mix and drag).

The instability of a freely directed gas jet makes it more difficult for it to enter and penetrate the cut, thus aggravating the chocking phenomenon, of the viscous and thermal kind, typical of subsonic and supersonic jets in a duct. In the portion of the duct downstream from the chocking section, speed is significantly reduced. Traditional cutting faces, therefore, present a longitudinal line (i.e., parallel to the top and bottom surfaces of the workpiece), imputable to the chocking effect and, up-and downstream from such a line, a series of differently sloping score lines, indicative of a change in flow speed. In particular, the slope of such score lines is greater downstream from the chocking line, thus pointing to a flow speed reduction.

A significant reduction in flow speed also results in variations of scoring frequency, as well as in erosion accompanied by droplets of liquefied material. Such phenomena being caused by the uncontrolled exothermic reaction produced by greater penetration of the face by the isotherm (about 720° C.) triggering said reaction.

According to the above method, oxygen interacts with a large portion of the laser beam for a considerable length of time already before reaching the workpiece, thus heating to an extremely high temperature and consequently affecting, both chemically and physically, the cutting process: in particular, the coefficient of refraction varies irregularly, thus impairing focusing of the laser beam, which is further affected by the convective motions produced by such heating. If the gas is heated long enough for it to reach, first of all, the thermal excitation threshold and, thereafter, the thermal ionozation threshold, this may result in dissipation absorbing, even at laser cutting power levels, the power of the laser beam.

The reduction in power and defocusing of the beam combine to reduce the power and increase the diameter of the focal spot, both of which effects are unfavourable for obtaining as narrow a cut as possible. Moreover, the instability caused by both convective motion and flow phenomena required for the gas jet to penetrate the cut, results in unsteady phenomena which also affect cutting efficiency and cutting faces quality: scoring, tears, undesired metallurgical properties.

Most of these drawbacks have been partially obviated by means of cutting processes as disclosed in WO-A1-93/10938, wherein the jet of gas is guided on to the cutting area, preferably at a supersonic speed. In such a way, instability phenomena, connected with both freely directed gas jet and useless interaction between gas and laser beam, are reduced, thus resulting in a more regular process and, consequently, in improved cutting quality, as well as better oxygen use.

However, the results so achieved are still far from being fully satisfactory, both as to power and gas consumption and as to productivity.

Indeed, according to the available information concerning the use of oxygen in the known devices, thermal energy increases by 30–40% as compared to the case wherein oxygen is not employed, i.e., the case wherein the laser beam supplies the whole of the thermal energy.

Given that iron combustion energy is at least four times higher than its fusion energy, the above information enables us to affirm that such an increase in energy represents a very small portion only of the theoretically available energy (10%), and, consequently, that combustion does not take place in an efficient enough manner, due to the gas being improperly directed on to the cutting surface.

Such a poor cutting efficiency of the known processes results in a relatively reduced cutting speed, while an increase in productivity would allow for an ampler use of the laser technology in all fields of application, such as, for instance, sheet metal cutting in the metal and mechanical industry in general and in the automobile industry in particular.

DISCLOSURE OF INVENTION

The aim of the present invention is to provide for a laser cutting process which may overcome the drawbacks typically associated with the known methods and which may allow, in particular, for both high cutting speed and quality.

Such an aim is obtained by the present invention in that it relates to a method for cutting a ferrous workpiece by means of a laser beam, wherein the beam is directed on to a cutting area of the workpiece and an oxygen jet is conveyed on to the cutting area through a solid-walled duct guiding the jet substantially until it comes into contact with a surface of the workpiece for producing iron oxidation exothermic reactions the laser beam and the workpiece undergoing relative motion, in a direction parallel to the surface of the workpiece, characterized in that:

the laser beam exercises on the workpiece a power density greater than $10^6$ kw/cm$^2$, oxygen is directed on to the cutting area of said workpiece with such an impact pressure, as to trigger, at the power density, complete iron oxidation exothermic reactions of the combustion type, and oxygen is fed in at least stoichiometric quantities so as to keep the complete reactions under dynamic balance condition.

BRIEF DESCRIPTION OF THE DRAWINGS

The present invention will be better described by way of a preferred embodiment with reference to the accompanying drawings, in which.

BEST MODE FOR CARRYING OUT THE INVENTION

Figure 1:
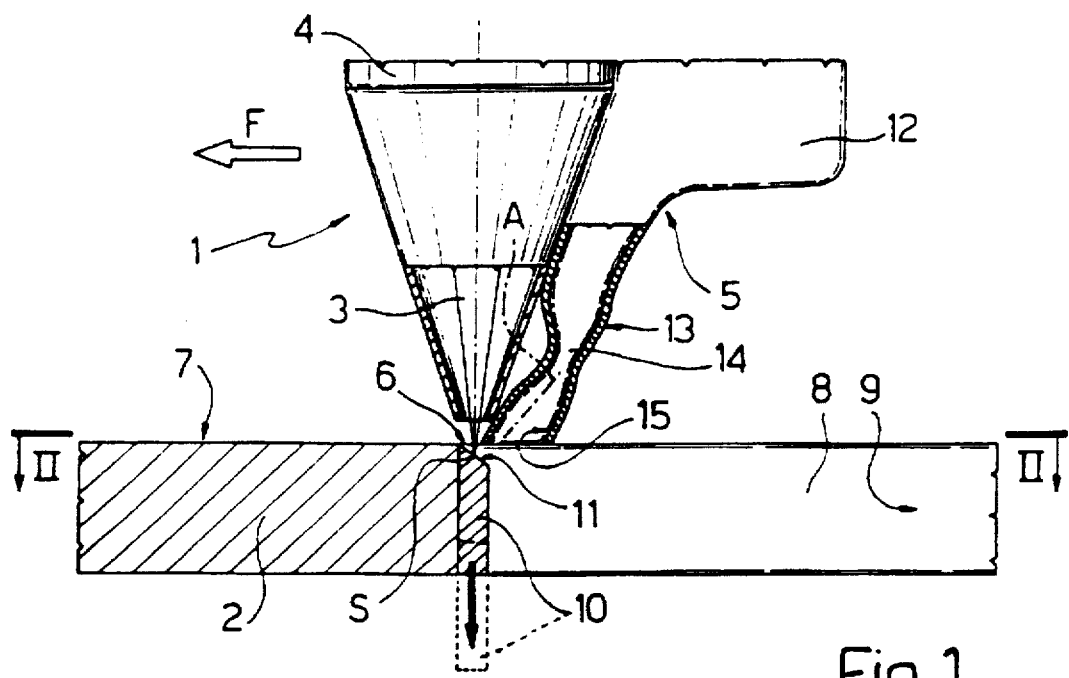
FIG. 1 is a schematic sectional elevation of a laser cutting device for a process according to the present invention.
Figure 2:
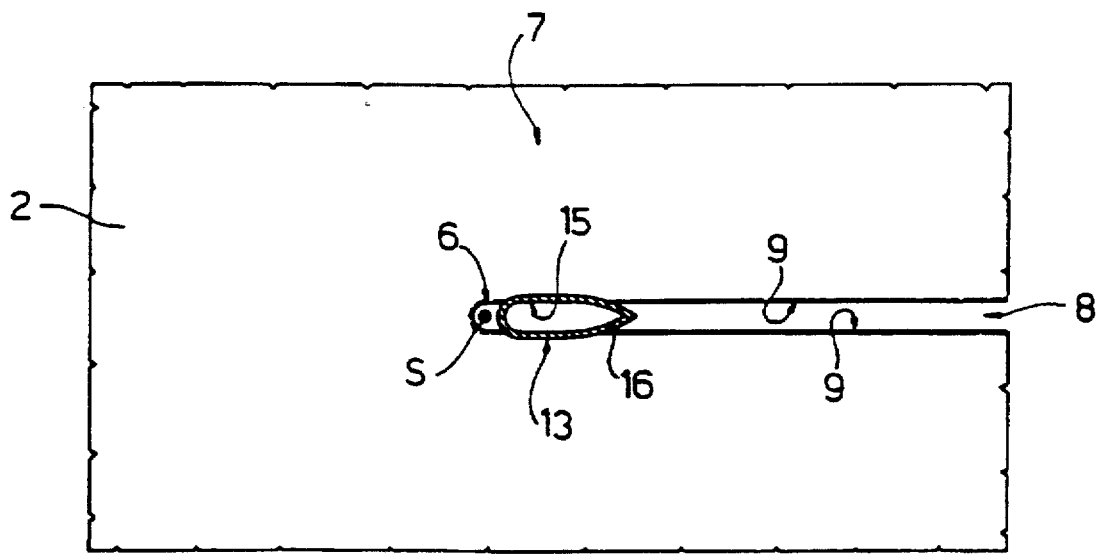
FIG. 2 is a larger scale sectional view taken along line II—II in FIG. 1.

With reference to FIG. 1, there is generically indicated with 1 a device for cutting a workpiece 2 of a ferrous material, e.g., a steel plate, by means of a laser beam 3.

Device 1 essentially comprises a focusing head 4 for focusing beam 3 and a device 5 to convey a jet of gas, in particular, a jet of oxygen, on to the cutting area.

Laser beam 3 is directed in such a manner, as to impinge on cutting area 6 of workpiece 2.

With respect to a surface 7 of workpiece 2, focal spot S shows a slight inward inclination. Both head 4 and the workpiece have a relative motion, e.g. (but not necessarily), along a straight line, so as to shift the incidence area of the beam along a preset line, for making cut 8. Arrow F shows the traveling direction of head 4 with respect to workpiece 2. There are indicated with 9 the walls, facing each other, originating from cut 8 and laterally defining it.

Beam 3 is conveyed on to workpiece 2 in a perpendicular direction, with respect to surface 7 of said workpiece, and causes a portion 10 of the material to liquefy; upper surface 11 of liquefied material 10 is inclined, with respect to the direction of the motion of head 4, as shown in FIG. 1.

Oxygen supply device 5 conveying oxygen on to the cutting area, essentially comprises a tank 12, wherein oxygen is stored at the so-called stagnation pressure and temperature ($P_0$, $T_0$), and a-duct 13, capable of conveying oxygen within solid walls and, therefore, guiding it on to the cutting area. Duct 13 conveniently defines, on its terminal portion, a convergent-divergent nozzle 14 for obtaining a supersonic jet, so as to allow for a better control of the jet, as well as for reducing mechanical stress on the nozzle, on the surface whereof pressure will be equivalent to stagnation pressure, less such losses, as are caused by shock waves depending on the profile taken up by the surface.

Duct 13 presents an outlet section substantially located in contact with surface 7 of the workpiece and having an elongated shape in the direction of the cut, its width being substantially equal to that of the cut and it length being 2–3 times the width. One end 16 of section 15, opposite to the cutting area, is conveniently tapered.

The jet is conveyed along direction A, inclined with respect to the perpendicular to surface 7 of the workpiece and preferably perpendicular to upper surface 11 of liquefied material 10.

Further to coming into contact with the oxygen, the upper surface is deformed and liquefied material 10 flows in contact with the solid material behind it, as shown by the hatching in FIG. 1, thus causing the liquefied material to be flushed out by a mechanical action.

As it is well known, the cutting process consists in the localized liquefaction of the material, thanks to the intense heat radiated by both laser beam and iron oxidation reactions, whose exothermic character is so high, as to significantly contribute to the liquefaction of the material, and in the subsequent flushing of the liquefied material out of the cut, further to the impact of the oxygen jet on to the liquefied mass.

Few are the studies that have been carried out in the past on the above reactions, particularly as regards chain reactions, both from the point of view of chemicals produced as temperature varies, and from that of chemical kinetics.

According to the present invention, oxygen is conveyed on to the cutting area with enough impact pressure to trigger an iron oxidation exothermic reaction of the combustion type, and in such a quantity as to slightly exceed the stoichiometric ratio, so that said combustion reaction may be a complete one and so as to maintain it under dynamic balance conditions, as explained hereinafter.

The main iron oxidation reaction at low temperatures is known to be as follows:

[1] $2Fe+O_2 \rightarrow 2FeO$ (4.779 kJ/g) Reaction [1] is an exothermic reaction and, at temperatures exceeding 720° C. takes on the characteristics of a "slow" combustion, such a term indeed indicating a non-explosive reaction.

At high temperatures (e.g., at iron fusion temperature, i.e., at about 1500° C. at ambient pressure) and in the presence of high-energy, highly reactive chemicals, such as the ones above the focal spot (dissociated iron steam, excited and ionized, dissociated oxygen, excited and ionized), the exothermic reactions to be taken into consideration, besides reaction [1] hereinabove, are the following:

[2] $3Fe+2O_2 \rightarrow Fe_3O_4$ (6.673 kJ/g);

[3] $4Fe+3O_2 \rightarrow 2Fe_2O_3$ (7.367 kJ/g).

Combustion energy for each reaction is given in brackets. It is to be pointed out that such energies are well above those needed for iron fusion, i.e., 1010 kJ/g. Therefore, the energy obtained from iron combustion in accordance with stoichiometric relations according to the present invention, is more than 4 times (up to about 7 times) fusion energy, i.e., the energy to be supposedly used during laser cutting with an inert gas jet.

Comparing such a result with the prior art, providing for a 30–40% increase, the present invention may well be regarded as to allow for the energy to be derived from the gas jet to be 10-15 times greater than the prior art, at the same time reducing oxygen consumption down to a quantity only slightly exceeding the stoichiometric values.

According to the present invention, the material is subjected to a laser beam having high power density, in particular, greater than $10^6$ kW/cm$^2$, thus creating a liquefied surface area, at the center whereof there are produced, out of the overheated liquid, steam and plasma. At such conditions, temperature may vary locally from values corresponding to iron fusion temperature (1540° C.) to thousands of degrees Celsius in the steam, and to 100,000° C. in the plasma.

Such conditions favor the creation of active radicals mainly originating from both metal and residual products of the ambient gas, which, in the presence of an oxygen jet having suitable pressure and temperature (the latter being substantially defined by the temperature of the metallic vapours produced by the laser-material interaction), may set the conditions for triggering a reaction, namely a substantial increase in reaction velocity.

In particular, at an oxygen stagnation pressure of 10-15 bars, power densities in the range of $10^6$ to $10^7$ kW/cm$^2$ allow for a complete iron combustion reaction to be triggered, i.e., wherein the relation between oxygen consumption and the quantity of liquefied and flushed-out material substantially corresponds to the stoichiometric values.

The increase in the reaction speed, caused by oxygen being used to the full, causes very high thermal power to become available; the latter determines the capacity to produce external work and, consequently, the cutting speed; however, such a power is to be properly managed, as described hereinafter, both in order to exploit its beneficial effects in terms of process efficiency, and to maintain the process under dynamic balance conditions, which prevent the length of the cut from extending.

In particular, according to the present invention, in order for the complete combustion reaction to be maintained under substantially stable conditions in time, it is first of all necessary to carefully adjust the oxygen jet, so that oxygen be present in the cutting area at least in stoichiometric quantities, conveniently slightly exceeding such stoichiometric values, with respect to the iron. Moreover, in the presence of such a power density, as may trigger the complete reaction, as well as of a sufficient quantity of oxygen to keep it up, it is necessary to prevent the ensuing heat from resulting in excessive propagation of the exothermic reaction in a transverse direction, with respect to the cut and, consequently, in an excessive cut width.

According to a further characteristic of the present invention, the foregoing is obtained by increasing cutting speed proportionally to the increase in thermal power produced by the complete exothermic reaction, and, therefore, by reducing the effects of heat transmission by conduction in the workpiece in a transversal direction, with respect to the cut. With reference to the combustion energy values of the above reactions, cutting speed can be increased by a factor ranging from 4 to 7, as compared to the speed, that may be obtained in the absence of an exothermic reaction, i.e., in the event the gas employed were an inert gas and the whole of the thermal power were supplied by the laser beam. The foregoing corresponds to a cutting speed increase by at least 3 to 4 times the traditional cutting methods, which is one of the aims of the present invention.

The increase in the reaction kinetics, namely, the presence of such conditions, as are enough to ensure completion of the reaction, results in the almost complete absorption of the oxygen which becomes part of either the liquid or the solid phase created by the reaction products, thus avoiding, in the area between the walls of the cut, all fluid-dynamic phenomena, such as the liquefied material breaking down into droplets, with consequent mixing and heating of the oxygen that has not taken part in the reaction, as well as all the other drawbacks that have been previously described, including fluid-dynamic and thermic chocking.

Besides said increase in the cutting speed, the present invention further allows for a decrease in the laser power in that, unlike traditional methods, the laser beam does not have to liquefy the whole of the iron volume; indeed, an energy requirement equivalent to 20% of the overall requirement may well be foreseen for said laser beam, the remaining energy being supplied by oxygen.

At oxygen stagnation pressures of a few tens of bars, e.g., 60 bars, and at power densities greater than $10^7$ kW/cm$^2$, there is triggered a combustion reaction of the explosive type, i.e., whose reaction speed may be over 100 times the one normally attained. Also in this instance, combustion reaction must be maintained under dynamic balance conditions by supplying oxygen in such a quantity, as may slightly exceed the stoichiometric ratios and by increasing the cutting speed so as to prevent the greater thermal power, generating further to iron combustion, from causing an undesirable widening of the cut.

The presence of a fast reaction (explosive) area, along with the foregoing, causes a thermal-mechanical shock at the boundary with the solid material, thus reducing the material's strength capacity by 10. Such a reduction may be imputed to the incapacity of the material to elastically resist impact loading, thus causing its crystal structure to disgregate. The material may, therefore, break down into small granules, easily attacked by the excess oxygen, present at high temperatures, thus contributing, in turn, to further increase combustion speed.

A further increase in the cutting speed, by a factor 10, may be attributed to the loss of strength and to the increase in exothermic power.

A study of the cutting process according to the present invention highlights th advantages deriving thereof. Oxygen being used in full allows for a much greater thermal power to be made available around the cutting area; therefore, only a relatively small portion of the thermal power needed for cutting is to be supplied by the laser beam, the remaining power being supplied by the combustion reaction itself, thus leading to a higher process speed and, thanks to the substantially complete absorption of the oxygen in the cutting area, to a noticeable improvement in both quality and reliability of the process, all thermal-fluid-dynamic drawbacks caused by the excess oxygen being removed. Finally, the above process may be modified in such a way, as not to exceed the scope of protection of the claims.

In particular, suction means for the excess oxygen may be provided for in the cutting area, so as to avoid all the undesired thermal-fluid-dynamic phenomena described hereinabove.

What is claimed is:

1. A method for cutting a workpiece (2) of ferrous material by means of a laser beam (3), wherein said laser beam is directed on to a cutting area (6) of said workpiece, and an oxygen jet is conveyed on to said cutting area (6) through a solid-walled duct (13) guiding the jet substantially until the jet comes into contact with a surface (7) of said workpiece (2), said laser beam (3) and said workpiece (2) undergoing a relative motion, characterized in that:

said laser beam (3) exercises on said workpiece (2) a power density greater than $10^6$ kW/cm$^2$, oxygen is conveyed on to said workpiece (2) with sufficient impact pressure to trigger, at said power density, iron oxidation exothermic combustion reactions, and oxygen is conveyed on to said cutting area (6) in a quantity corresponding to at least a stoichiometric value of an amount of ferrous material to be liquefied and flushed out, so that complete reactions are maintained under dynamic balance conditions.

2. A method according to claim 1, characterized in that the quantity of oxygen, directed onto said cutting area (6), slightly exceeds the relevant stoichiometric valve.

3. A method according to claim 1, characterized in that the speed of said relative motion between said laser beam and said workpiece is increased, as compared to a cutting process employing an inert gas and wherein the same thermal power is supplied by the laser beam only, at least by a factor equal to the ratio: exothermic reactions combustion energy/iron fusion energy.

4. A method according to claim 1, characterized in that said duct (13) is so oriented, as to direct said gas jet in a direction (A), perpendicular to an upper free surface (11) of liquefied material (10).

5. A method according to claim 1, characterized in that said duct comprises an outlet section (15), elongated in a direction of a cut.

6. A method according to claim 5, characterized in that a width of said outlet section (15) substantially corresponds to a width of said cut (8), a length of the outlet section being 2-3 times the width of said cut (8).

7. A method according to claim 5, characterized in that said outlet section (15) tapers in a direction away from to said cutting area (6).

8. A method according to claim 1, characterized in that said jet is supersonic.

9. A method according to claim 1, characterized in that said laser beam (3) exercises on said workpiece (2) a power density, greater than $10^7$ kW/cm$^2$ and that said iron combustion reactions.

* * * * *